United States Patent [19]

Chandler et al.

[11] Patent Number: 4,777,058

[45] Date of Patent: Oct. 11, 1988

[54] COMPOSITE ANIMAL FOOD

[75] Inventors: Ronald G. Chandler, Millville; Kent D. Crosby, Mifflinville, both of Pa.

[73] Assignee: Star-Kist Foods, Inc., Long Beach, Calif.

[21] Appl. No.: 928,664

[22] Filed: Nov. 6, 1986

Related U.S. Application Data

[63] Continuation of Ser. No. 700,276, Feb. 11, 1985.

[51] Int. Cl.$^4$ ................................................. A23K 1/00
[52] U.S. Cl. ..................................... 426/448; 426/514; 426/518; 426/623; 426/630
[58] Field of Search ................. 426/514, 518, 99, 293, 426/302, 623, 630, 805, 512, 513; 425/133.1, 463

[56] References Cited

U.S. PATENT DOCUMENTS

| | | | |
|---|---|---|---|
| 3,119,691 | 1/1964 | Ludington et al. | 426/302 X |
| 3,139,342 | 6/1964 | Linskey | 426/293 |
| 3,189,941 | 6/1965 | Reifenhauser | 425/133.1 |
| 3,202,514 | 8/1985 | Burgess et al. | |
| 3,615,647 | 10/1971 | Kassens | |
| 3,751,202 | 8/1973 | Coleman et al. | 425/133.1 |
| 3,916,029 | 10/1975 | Hildebolt | |
| 4,011,345 | 3/1977 | Bartsch | |

FOREIGN PATENT DOCUMENTS 560490 7/1958 Canada .

OTHER PUBLICATIONS

Lucky Dog ® (Copy of packaging).
Waggles ® (Copy of packaging).

*Primary Examiner*—R. B. Penland
*Attorney, Agent, or Firm*—Banner, Birch, McKie and Beckett

[57] ABSTRACT

A biologically stable animal food composition as described having a crunchy shell of a low water activity consisting essentially of edible starch- and protein-containing flour at least partially surrounding a deformable core of a low water activity including edible protein and water soluble solids, which composition retains the distinct textures of the shell and core even after prolonged ambient exposure.

3 Claims, No Drawings

COMPOSITE ANIMAL FOOD

This application is a continuation of Ser. No. 700,276, filed Feb. 11, 1985.

BACKGROUND OF THE INVENTION

1. Field of the Invention

The present invention relates to a highly nutritious and biologically stable animal food composition having a crunchy shell at least partially surrounding a relatively soft, deformable core. The composition can be stored without refrigeration for a substantial period of time in non-hermetically sealed packages and retains the novel and distinct characteristics of the shell and core even after prolonged ambient exposure. The present invention also relates to a novel process for making the composition.

2. Description of the Prior Art

U.S. Pat. No. 3,916,029 describes a biologically stable animal food composition having a deformable, shape-retaining proteinaceous inner matrix surrounded by an outer pastry shell. The proteinaceous matrix has a water content of 15–40% by weight, less than 15% by weight of sugar and between 3% and about 4% by weight of salt sufficient to yield a water activity of less than 0.85. The pastry shell is made primarily from flour and shortening (fat), contains less than 20%, and preferably 12% to 14% by weight water and includes sufficient sugar to yield a water activity of less than 0.85.

While this composition constitutes a nutritionally well-balanced and highly acceptable food for the household pet having all the convenience of conventional dry or meal-type animal food products, it lacks the rigid texture of conventional dry animal foods and accordingly also lacks the oral hygiene benefits derived by an animal from masticating such products. A further drawback of this prior art composition is that upon prolonged ambient exposure, such as occurs when the composition is left standing in an animal's feeding bowl, the inner matrix tends to lose its deformable character, causing the product to become less palatable for the animal.

It is an object of the present invention to provide a highly nutritious, biologically stable animal food composition having the convenience of dry tape animal foods and the meat-like characteristics animals find highly palatable in every piece.

It is another object of the present invention to provide an animal food composition that provides the oral hygiene advantages of the conventional dry or meal-type animal food without sacrificing palatability.

A further object of the present invention is to provide a biologically stable animal food composition having a crunchy shell at least partially surrounding a relatively soft, deformable meat-like core.

Yet another object of the present invention is to provide an animal food composition that retains its important textural characteristics even after prolonged ambient exposure.

It is still another object of the present invention to provide a process for preparing an animal food composition having a crunchy shell at least partially surrounding a relatively soft, deformable meat-like core.

These and other objects of the present invention will be apparent from a consideration of the specification and the appended claims.

SUMMARY OF THE INVENTION

The present invention relates to an aniaml food composition having a crunchy shell at least partially surrounding a deformable core which retains the distinct textures of the shell and core even after prolonged ambient exposure, said composition having a total edible protein content of at least about 12%, less than about 3% salt and less than about 20% sugar, said shell consisting essentially of edible starch- and protein-containing flour, having a maximum moisture content of about 12% and a water activity of below about 0.60, said core including edible sources of meat and vegetable protein as its main ingredients and having a moisture content within the range of about 5% to about 20% and sufficient water soluble solids to give a water activity of below about 0.60, wherein the relative water activity of the core to the shell is less than about 1.4 and wherein substantially all of the water soluble solids of said composition are included in the soft deformable core.

In another aspect, the present invention relates to a process for the preparation of the above-described animal food composition, having a crunchy shell at least partially surrounding a deformable core comprising:

(a) extruding the components of the shell at an elevated temperature and pressure in the shape of a continuous hollow cylinder, said temperature and pressure being sufficient to cause at least a portion of the moisture content of said shell to flash as said shell is extruded, whereby a porous structure is formed in the extruded shell, (b) injecting the components of the core into a section of said extruded shell which is sufficiently rigid to bear the radial pressure load of said injected core material, so as to completely fill the volume enclosed by said extruded shell to thereby form an extruded product, and (c) cutting the extruded product into pieces.

DETAILED DESCRIPTION

The composition of the present invention provides all of the convenience and advantages of conventional meal-type or dry animal foods. It can be stored for a long period of time in a non-hermetically sealed package without refrigeration, i.e., it is biologically stable. It is as nutritionally balanced as the meal or dry tape animal foods and the product's crunchy shell provides animals such as dogs and cats with the same oral hygiene benefits as conventional dry products. The palatability of the inventive composition, however, far exceeds the typical dry animal food composition.

While the overall structure of the present invention, i.e., an outer shell surrounding a deformable core, is superficially similar to the animal food product described in U.S. Pat. No. 3,916,029; as will be detailed below in connection with the description of this invention, several important distinctions separate the present composition from this prior art product.

One of the many features which distinguishes the present invention from the product described in U.S. Pat. No. 3,916,029 is the water activities ($A_w$) of the core and shell. Quantitatively, water activity is equal to the vapor pressure of a composition divided by the vapor pressure of pure water under the same conditions. It is water activity, and not total water content that is indicative of the water available in a system which will support biological and chemical reactions. For the purpose of this invention relative water activity is defined as the ratio of the water activity of the core to the water activity of the shell.

While Raoult's law can conveniently be utilized to estimate water vapor pressure for various compositions in calculating the water activity of the shell and core, it should be emphasized that this is merely an estimation tool. Measured vapor pressure always should be used in any final determination of the product's water activity. Vapor pressures are measured using well known techniques after separating and isolating the material of the shell from the core.

In the present invention, the water activity of the shell must be below about 0.60 and is preferably below about 0.5; while the water activity of the deformable core also must be below about 0.60 and is preferably below about 0.5. The relative water activity of the composite product, as defined above, must be less than about 1.4 and preferably is within the range of about 0.9 up to about 1.1.

Where there is a difference between the water activity of the shell and the water activity of the core, there is a tendency for water to migrate from the region of higher water activity to the region of lower water activity until the water activities equilibrate. The relative water activity is an important factor for maintaining the quality of the product of the present invention because excessive migration of water from the core to the shell can significantly degrade its important crunchy characteristics.

The deformable core of the present invention is formulated to have a final moisture content within the range of about 5% to about 20%. Unless otherwise stated, all percentages reported throughout the specification and claims are by weight. Preferably, the moisture content of the deformable core is within the range of about 10% to about 15%. In functional terms, the initial moisture content of the deformable core must be high enough to permit it to be injected into the shell, yet must be low enough that the core retains its shape once injected into the shell. Generally, some moisture is lost during processing the core from the time it is prepared to the time it is injected into the shell.

Materials chosen for the deformable core are generally the same as those included in prior art animal food compositions of both the dry, metal-type and semi-moist variety and include edible plant and animal protein as the main ingredient, edible fat, sugar, salt, humectants, antimycotics and other additives, such as colorings and pH modifiers. The ingredients are well blended, cooked (pasteurized) and injected into the final product. Since some water is lost during processing, the initial water content of the blended mixture should be somewhat higher than the targeted value.

As noted, the deformable core component of the animal food composition of this invention includes as its main ingredient edible sources of plant and animal protein. Typically, any of the wide variety of protein ingredients generally used in animal food compositions as described in the prior art can suitably be employed in the present invention. Animal protein sources used in the present invention normally include meat, meat byproducts and meat and bone meal obtained from mammals, poultry and fish. Plant protein sources generally will include plant seeds, particularly from leguminous plants, as well as the oil-expressed or extracted meals and isolates recovered therefrom using known techniques.

Except for the presence of low molecular weight water soluble components, the water activity of the deformable core would normally be capable of supporting the growth of undesirable micro-organisms responsible for food spoilage. However, the concentration of such water soluble ingredients is maintained sufficiently high so that the water activity of the core is maintained below the above-noted level. Any of the low molecular weight water soluble solids used in the prior art can advantageously be employed to control the water activity of the deformable core in the present invention.

On a weight basis, sugar typically is the predominant water soluble solid used in the composition. Other water soluble solids, such as inorganic alkali metal salts and propylene glycol, also contribute to maintaining a proper water activity in the deformable core. As noted above, sufficient water soluble solids are added to the deformable core to yield a water activity of less than about 0.60 and preferably less than about 0.5.

As used in the present invention, the term "sugar" includes any of the wide variety of useful edible saccharide compounds known to decrease the water activity of a composition. Included in the broad list of suitable sugars are the non-reducing and reducing water-soluble mono-saccharides and the reducing and non-reducing polysaccharides as well as their degradation products. Common table sugar, i.e., sucrose preferably is used in the composition as a readily available carbohydrate source for the animal. Additionally, a less digestible sugar such as fructose also is employed and represents an extremely economical source of water soluble solids. Some sugar also may be added to the composition as a component of other ingredients. For example, cereal food fines which may be employed primarily as a farinaceous source, often will contain a significant quantity of sugar. Generally, the total sugar content of the deformable core will be in the range of about 15% to about 27%, preferably about 18% to about 20%.

Both common table salt, i.e., sodium chloride, and potassium chloride typically will be included in the composition not only for their influence on water activity but primarily as the source of the minerals sodium and potassium. If desired, other inorganic salts could also be used. Preferably, such salts are used at a level which is compatible with the animal's palate and which minimizes any adverse physiological impact of salt in the diet of the animal. Generally, the added salt content of the deformable core will be less than about 12% and preferably is within the range of about 3% to about 5%.

Since certain undesirable organisms, such as molds, can potentially grow even under the harsh environmental conditions existing in the deformable core, the core also includes an antimycotic. Any of the antimycotics disclosed in the prior art are suitable for use in the present invention and include benzoic acid, sodium benzoate, proprionic acid, sodium and calcium proprionate, sorbic acid, potassium and calcium sorbate, propylene glycol, and others known to those skilled in the art. Potassium sorbate generally is preferred. Normally, propylene glycol also is used in the composition because it is capable of serving a multiple role as a source of water soluble solids, as a mold inhibitor (antimycotic), as a miticide and as a plasticizing humectant for improving the deformable texture of the core.

The core is at least partially surrounded by a crunchy shell which may have the texture of conventional dry animal foods. Typically, the shell can be characterized by its tendency to abruptly and audibly fracture, rather than deform, under a stress. The main constituent of the shell is a starch- and protein-containing flour. A wheat flour containing starch of a sufficient quality for yielding a shell with the best crunchy texture characteristics is preferred. Generally, the flour used for the shell is formulated from a blend of materials and may, in part, include a high vegetable protein source such as soybean meal. As used herein, the term "flour" embraces not only ground cereal grains such as wheat but also the ground material from other edible seeds such as soybeans.

Generally, the flour component of the shell comprises between about 85% and up to about 100% of the shell, and preferably about 93%. The shell also may include mineral and vitamin additives. Importantly, the shell should not include such ingredients as fat (shortening) and propylene glycol or other humectants at a level which would change its desired crunchy texture. Preferably none of these ingredients are included in the shell. Water then may be added to the ingredients of the shell as needed to produce the texture desired. The texture of the shell is influenced in part by the moisture content of the initial blend of ingredients and the processing conditions as will be explained in more detail hereafter.

An important feature of the present invention is that the moisture content of the shell in the ultimate composition is maintained sufficiently low so that it is not necessary to include any water soluble solids in the shell in order to limit the shell's water activity. Substantially, all of the low molecular weight water soluble solids of the total composition are included in the deformable core. As a result, the moisture content of the shell in the final product must be less than about 12%. Preferably, the shell has a moisture content of between about 6 to about 10% and optimally between about 8 and 9%.

While the initial moisture content of the shell mixture can be as high as about 20% to 30% prior to extrusion, it is preferable to limit the moisture content of the initial mixture of shell ingredients to less than about 20% and more preferably to below about 15% to 18% so as to minimize the quantity of moisture that must be removed during processing to yield the required moisture content and texture in the shell of the final product. The initial moisture content of the shell ingredients influences the texture of the final product by influencing the degree of expansion at any set of processing conditions. Generally, more expansion yields a shell with greater porosity.

The low moisture content of the shell renders the shell biologically stable against spoilage by such organisms as yeasts, molds and bacteria. In fact, as noted above an important feature of the present invention is that low molecular weight soluble solids are not needed to control the water activity of the shell and substantially all of such solids are included in the deformable core. As a consequence of its low water content, the water activity of the shell is less than about 0.60 and preferably is less than about 0.5. The total moisture of the composition, core and shell generally will be in the range of above about 5% up to about 12%.

Applicants have found that including substantially all of the water soluble solids in the deformable core, maintaining the water activities of the shell and core below about 0.60 and maintaining the relative water activity less than about 1.4 and preferably within the range of about 0.9 to about 1.1 insures that the textural characteristics of both the deformable core and the crunchy shell are retained even after prolonged ambient exposure, as for example occurs when the composition is left standing in an animal's feeding bowl for prolonged periods. Since normal ambient humidity is in the range of about 40% to about 65%, the moisture content of the core of this invention is closer to its moisture equilibration end point and thus the core loses its moisture content much more slowly than the core of the product of U.S. Pat. No. 3,916,029. In addition, the greater level of propylene glycol and fat in the core of the present invention as compared to the core in the product of the above-noted patent tends to dampen any change in the deformable character of the core as moisture is lost. As a result, the deformable character of the core is retained for much longer periods under ambient exposure conditions than exhibited by the core of the prior art composite product of U.S. Pat. No. 3,916,029.

The deformable core of the present invention can comprise anywhere from about 25% to about 75% of the final composition. Preferably, the deformable core comprises about 60% of the composition and the shell constitutes the remaining 40%. Overall, the composition has a total edible protein content of at least about 12% and preferably about 21%, contains less than about 3% salt and less than about 20% sugar. As noted above, preferably all of the sugar and salt is included in the deformable core.

The product of the present invention typically is prepared by separately formulating the compositions of the core and shell, separately cooking (pasteurizing) the mixture of ingredients of the core and shell, and then forming the separate components into the final product configuration using a device of a design which extrudes the ingredients of the shell in the form of a continuous hollow cylinder and injects the ingredients of the core into the extruded shell thereby providing a continuous product strand having the core surrounded by a shell of substantially uniform thickness. The extruded product then is cut into segments of any desirable length. If desired, melted animal fat or other palatable dressing can be applied to the cut segments, for example by spraying or dipping, to form an outer coating.

Table 1 illustrates a typical example of the ingredients for the core. As illustrated, the core is formulated by blending and simultaneously cooking (pasteurizing) a set of dry ingredients with an emulsified meat slurry using for example a conventional single screw extruder as available from Wenger Mfg., Sabetha, Kans. The meat slurry preferably is emulsified to facilitate subsequent processing of the composition.

TABLE 1

| Dry Ingredients | Percent of Core | Emulsified Meat Slurry | Percent of Core |
| --- | --- | --- | --- |
| Dicalcium Phosphate | 3.3 | Beef | 13.2 |
| Cereal Food Fines | 13.2 | Fructose Corn Syrup | 13.2 |
| Meat and Bone Meal | 13.2 | Propylene Glycol | 6.0 |
| Soybean Meal | 13.2 | Animal Fat | 5.6 |
| Poultry By-Product Meal | 4.7 | Sugar | 7.0 |
| | | Salt (NaCl and KCl) | 2.9 |
| | | Potassium Sorbate | 0.2 |
| | | Minerals, color and pH additives | 0.4 |
| | | Added Water | 3.9 |

A suitable composition for the shell of the present invention is illustrated in Table 2. As noted above, enough water is added to these dry ingredients to yield the desired shell texture and produce a final product (shell) with a moisture content of about 5% to 12%.

TABLE 2

| Ingredient | Percent of Shell |
| --- | --- |
| Wheat Flour | 57 |
| Soybean Meal | 36 |
| Dicalcium Phosphate | 4 |
| Vitamins, Flavoring, Color | 3 |

According to the process of this invention, the core and shell formulations are separately pumped at an elevated temperature and pressure to a dual extrusion die assembly. The equipment employed to carry out the process of this invention can be similar in design, with the below-noted exceptions, to equipment used to prepare the composite product of U.S. Pat. No. 3,916,029. The core material is pumped to the die inlet at a pressure within the range of about 200 to 600 psig, peferably about 450 psig, using a VEMAG Pump available from Reiser Food Processing Equipment, Boston, Mass. The shell material typically is pumped to the dual extrusion die assembly using a twin screw extruder such as a Creusot-Lori-BC 72 available from CL-Simon, Inc., Kansas City, Kans. Other equipment useful for carrying out the process of this invention will be apparent to those skilled in the art.

Preferably, the shell material is heated during the course of extrusion to a temperature in excess of about 260° F. (about 127° C.), preferably about 320° F. (160° C.), at a pressure anywhere within the range of about 1000 to about 3000 psig, preferably 1500 psig. Much higher operating pressures and temperatures are involved in extruding the shell of the present composition as compared with the prior art composite product.

As noted above, the shell material is extruded in the form of a continuous hollow cylinder through a suitably designed (ring-shaped) outlet opening (die) and the core material is injected into the shell. Of course any tubular shape can be used for the shell and the term "hollow cylinder" is used to embrace such myriad forms. When the shell first exits the extrusion die it will not immediately have the firm, crunchy texture characteristic of the final product. Rather the shell progressively, although quite quickly, develops this characteristic as it is moves from the die opening. The core material is injected into a section of the extruded shell which has become sufficiently rigid to bear the radial pressure load of the injected core material. Preferably, this is accomplished in the practice of the process of this invention by employing an injection tube for the core material which is within and protrudes from the die outlet opening for the shell. At the above-noted processing conditions, the length of this protrusion is on the order of about 1 to 3 inches. This protrusion allows a short period of time for the shell to attain a firmer and more rigid structure before the core material is injected into the interior of the shell.

It is believed that a certain pressure on the flow of core material in the radial direction is necessary to completely and tightly fill the void center volume of the extruded shell. To achieve this result, the core material is injected into the shell at a volumetric flow rate slightly greater than needed to fill the void center volume of the shell. Morever, in order to oppose the radial pressure of the injected core material and maintain a constant core to shell mass ratio without fracturing the shell or significantly changing its structure a certain degree of rigidity of the shell is required. Therefore, a short period of time must be provided to allow the shell to obtain a certain degree of rigidity before injecting the core material into the shell.

It is also believed that the degree of core packing into the shell, the shell and core temperatures, the shell and core compositions, and the length of time the shell and core are together as a continuous extruded product before cutting into smaller pieces all contribute to a firm bond at the interface between the core and the shell. Interfacial adhesion between the core and the shell helps to prevent the core from falling out of the finished product during subsequent handling and storage of the smaller pieces. Variation of these parameters to obtain a suitable product is within the skill of the art.

Because of the high temperature and pressure used to extrude the shell, the shell material expands as its exits the die assembly. In addition, a significant amount of the moisture content of the shell material flashes as the mixture exits the extrusion die assembly. Of course, the degree of flashing is influenced by both the initial moisture content and the processing conditions. This flashing not only contributes to a lowering of the moisture content of the shell, but it also produces a porous structure in the shell thereby reducing its density and strongly influencing its texture. This porosity makes the product easier for the animal to chew. The selection of particular moisture contents and processing conditions within the recited ranges for producing shells of various porosities and textures is within the skill of the art. Preferably, sufficient flashing occurs so that the calculated expansion ratio, defined as the ratio of the area of the shell cross-section in the extruded product to the area of the ring-shaped outlet opening in the extrusion die, is greater than about 2.5.

EXAMPLES 1-16

The superior palatability characteristic of the present invention, as compared to commercially available dry animal foods, is demonstrated in the following examples. The compositions of the present invention used in Examples 1 to 16 (Tables 3-18) were prepared substantially in accordance with the formulas of Tables 1 (absent poultry by-product meal) and 2 for the core and shell components respectively. The composite product itself was produced using various core to shell mass ratios within the range outlined above and with varied process conditions as also described above.

In these examples 30 adult beagles housed in indoor pens were used to determine the relative palatability of two animal food compositions over a four day period. The amount of food offered to each animal was twice the amount of food required by the beagles. An equal amount of each food composition was weighed into separate feed pans. Both feed pans then were offered simultaneously to each of the 30 beagles. Each of the beagles had access to both foods for 45 minutes. Afterwards, both pans were removed from the dogs, and the food left in each pan was weighed.

The amount of each food consumed by each dog then was calculated and statistically analyzed. The results are presented in Tables 3 through 18. The daily data is reported as the consumption ratio. The consumption ratio is calculated by dividing (1) the total daily amount (by weight) of the product of this invention consumed by all thirty dogs by (2) the amount of the comparison product consumed. The cumulative value of the consumption ratio also is shown. The cumulative consumption ratio is obtained by calculating the consumption ratio over the four days, generally representing 120 feeding trials. the significance of a preference was determined by the dependent Student T-test statistical method for a null hypothsis that the difference in the present consumption between the two foods is zero (no preference). Therefore, rejection of the null hypothesis indicates a statistical preference. The magnitude of the consumption ratio greater than one indicates the strength of the preference by the dogs tested for the product of this invention. As shown, the animals tested showed a consistent and generally significant preference for the animal food composition of the present invention.

TABLE 3

THIS INVENTION v. PURINA PRAISE

| Day | Consumption Ratio |
|---|---|
| 1 | 5.58 |
| 2 | 5.27 |
| 3 | 4.91 |
| 4 | 4.05 |
| Cummulative | 4.88 |

TABLE 4

THIS INVENTION v. KIBBLES N'BITS

| Day | Consumption Ratio |
|---|---|
| 1 | 3.34 |
| 2 | 1.45 |
| 3 | 1.44 |
| 4 | 1.32 |
| Cummulative | 1.75 |

TABLE 5

THIS INVENTION v. PURINA DOG CHOW

| Day | Consumption Ratio |
|---|---|
| 1 | 14.06 |
| 2 | 19.95 |
| 3 | 15.28 |
| 4 | 14.23 |
| Cummulative | 15.46 |

TABLE 6

THIS INVENTION v. PURINA DOG CHOW

| Day | Consumption Ratio |
|---|---|
| 1 | 40.19 |
| 2 | 33.97 |
| 3 | 30.11 |
| 4 | 15.64 |
| Cummulative | 26.62 |

TABLE 7

THIS INVENTION v. PURINA DOG CHOW

| Day | Consumption Ratio |
|---|---|
| 1 | 117.5 |
| 2 | 34.16 |
| 3 | 86.75 |
| 4 | 85.69 |
| Cummulative | 64.45 |

TABLE 8

THIS INVENTION v. PURINA DOG CHOW

| Day | Consumption Ratio |
|---|---|
| 1 | 8.35 |
| 2 | 7.22 |
| 3 | 8.16 |
| 4 | 7.02 |
| Cummulative | 7.66 |

TABLE 9

THIS INVENTION v. PURINA DOG CHOW

| Day | Consumption Ratio |
|---|---|
| 1 | 6.83 |
| 2 | 10.42 |
| 3 | 5.59 |
| 4 | 10.63 |
| Cummulative | 7.74 |

TABLE 10

THIS INVENTION v. PURINA DOG CHOW

| Day | Consumption Ratio |
|---|---|
| 1 | 8.36 |
| 2 | 7.53 |
| 3 | 8.72 |
| 4 | 8.36 |
| Cummulative | 8.22 |

TABLE 11

THIS INVENTION v. PURINA DOG CHOW

| Day | Consumption Ratio |
|---|---|
| 1 | 37.19 |
| 2 | 74.31 |
| 3 | 24.81 |
| 4 | 70.13 |
| Cummulative | 42.25 |

TABLE 12

THIS INVENTION v. PURINA DOG CHOW

| Day | Consumption Ratio |
|---|---|
| 1 | 27.23 |
| 2 | 14.23 |
| 3 | 17.22 |
| 4 | 5.59 |
| Cummulative | 11.51 |

TABLE 13

THIS INVENTION v. PURINA DOG CHOW

| Day | Consumption Ratio |
|---|---|
| 1 | 5.94 |
| 2 | 8.09 |
| 3 | 8.36 |
| 4 | 7.03 |
| Cummulative | 7.23 |

TABLE 14

THIS INVENTION v. PURINA DOG CHOW

| Day | Consumption Ratio |
|---|---|
| 1 | 7.74 |
| 2 | 7.96 |
| 3 | 5.53 |
| 4 | 3.37 |
| Cummulative | 5.12 |

TABLE 15

| | THIS INVENTION v. PURINA DOG CHOW |
|---|---|
| Day | Consumption Ratio |
| 1 | 1.10 |
| 2 | 1.83 |
| 3 | 1.80 |
| 4 | 1.47 |
| Cummulative | 1.50 |

TABLE 16

| | THIS INVENTION v. PURINA DOG CHOW |
|---|---|
| Day | Consumption Ratio |
| 1 | 10.86 |
| 2 | 13.84 |
| 3 | 6.91 |
| 4 | 5.13 |
| Cummulative | 8.33 |

TABLE 17

| | THIS INVENTION v. PURINA DOG CHOW |
|---|---|
| Day | Consumption Ratio |
| 1 | 65.84 |
| 2 | 69.06 |
| 3 | 22.51 |
| 4 | 147.00 |
| Cummulative | 50.76 |

TABLE 18

| | THIS INVENTION v. PURINA DOG CHOW |
|---|---|
| Day | Consumption Ratio |
| 1 | 9.50 |
| 2 | 10.17 |
| 3 | 18.57 |
| 4 | 15.32 |
| Cummulative | 12.19 |

While the present invention has been described with respect to preferred embodiments, it should be understood that various changes may be made without departing from the spirit and scope of the invention as particularly claimed below.

What is claimed is:

1. A process for the preparation of an animal food composition having a total edible protein content of at least about 12%, less than about 3% salt and less than about 20% sugar, the composition having a crunchy shell which has a tendency to abruptly and audibly fracture under a stress said shell surrounding a deformable core, consisting essentially of:

(a) extruding components of the shell at a temperature of at least about 260° F. and at a pressure of about 1000 to 3000 psig through an annular die in the form of a continuous hollow shape, said shell consisting essentially of edible starch and protein-containing flour, said shell having a moisture content of about 12% and a water activity of below about 0.60, said temperature and pressure being sufficient to cause at least a portion of the moisture of said shell to flash as said shell is extruded to provide a porous structure, (b) extruding components of the core into a section of said extruded shell after a delay sufficient to allow the shell to become rigid enough to bear the radial pressure of said injected core components, so as to completely fill the volume enclosed by said rigid extruding shell to thereby form an extruded product, said core components including edible animal and plant protein, said core having a moisture content of about 5% to 20% and a sufficient amount of water soluble solids to give a water activity of below said 0.60 said core and said shell having a relative water activity ratio in the range of 0.9/1 to 1.4/1, and (c) cutting the extruded portion into pieces.

2. The process of claim 1 wherein said flashing provides an expansion ratio of the extruded shell cross sectional area to the ring shaped die cross sectional area greater than about 2.5.

3. The process of claim 1, wherein the water-soluble solids are selected from the group consisting of salts and sugars.

* * * * *